(12) United States Patent
Ohlson

(10) Patent No.: US 11,490,752 B2
(45) Date of Patent: Nov. 8, 2022

(54) SPORTING EQUIPMENT MOUNT

(71) Applicant: Eric Ohlson, Lakeville, MN (US)

(72) Inventor: Eric Ohlson, Lakeville, MN (US)

( * ) Notice: Subject to any disclaimer, the term of this patent is extended or adjusted under 35 U.S.C. 154(b) by 0 days.

(21) Appl. No.: 17/139,453

(22) Filed: Dec. 31, 2020

(65) Prior Publication Data
US 2021/0196068 A1 Jul. 1, 2021

Related U.S. Application Data

(60) Provisional application No. 62/956,073, filed on Dec. 31, 2019.

(51) Int. Cl.
*A47G 29/00* (2006.01)
*A63B 59/70* (2015.01)
*A63B 60/56* (2015.01)
*F16M 13/02* (2006.01)

(52) U.S. Cl.
CPC .............. *A47G 29/00* (2013.01); *A63B 59/70* (2015.10); *A63B 60/56* (2015.10); *F16M 13/02* (2013.01)

(58) Field of Classification Search
CPC ........ A47G 29/00; A63B 59/70; A63B 60/56; F16M 13/02

USPC .......................................... 248/534, 110, 111
See application file for complete search history.

(56) References Cited

U.S. PATENT DOCUMENTS

| | | | | |
|---|---|---|---|---|
| 6,481,679 | B1 * | 11/2002 | Bennett | F16M 13/022 248/223.41 |
| 8,371,544 | B2 * | 2/2013 | Heitmeyer | F16L 3/10 248/229.11 |
| 10,112,096 | B1 * | 10/2018 | Taylor | A63B 59/70 |
| 2018/0292028 | A1 * | 10/2018 | Gossack | E01F 11/00 |
| 2018/0298929 | A1 * | 10/2018 | Lund | F16B 9/02 |
| 2021/0196068 | A1 * | 7/2021 | Ohlson | B25H 3/04 |

* cited by examiner

*Primary Examiner* — Muhammad Ijaz
(74) *Attorney, Agent, or Firm* — Brad J. Thorson; DeWitt LLP

(57) ABSTRACT

A device to easily mount and hold hockey sticks to a vertical structure, such as a wall. One embodiment includes a vulcanized rubber or EPDM body portion that can be attached to a wall. The body portion has a front recess that receives the shaft of a hockey stick and grips and holds the stick in place. The device can accommodate standard hockey stick shaft widths, and enables easy insertion and removal of hockey sticks.

13 Claims, 7 Drawing Sheets

SPORTING EQUIPMENT MOUNT

RELATED APPLICATION

The present application claims the benefit of U.S. Provisional Patent Application No. 62/956,073, entitled SPORTING EQUIPMENT MOUNT, filed Dec. 31, 2019, said application being hereby incorporated herein in its entirety by reference.

TECHNICAL FIELD

The present invention relates to a mount for attaching sporting equipment to a wall, and more specifically to a mount for releasably attaching a hockey stick or other similar sporting equipment to a wall.

BACKGROUND

It is desirable to store sporting equipment in such a way that the equipment is available for ready use. Prior art designs for storing hockey sticks are primarily fixed displays for memorabilia that do not permit the stick to be actually used. What is needed is a mount for a hockey stick that enables the stick to be stored and displayed, organized with other equipment, and that also enables each stick to be easily removed and replaced after use.

SUMMARY

The claimed invention answers the need in the art, and includes a device to easily mount and hold hockey sticks, or other similar sporting equipment, to a vertical structure, such as a wall. An embodiment comprises a body portion, which may be in the form of a hockey puck, with a receiving front recess. The body portion can be made from resilient flexible material such as vulcanized rubber or EPDM rubber, and can be made with geometry that enables flexing of the body portion to accommodate all standard hockey stick shaft widths, as well providing a surface to grip and hold the stick in place. The design enables easy insertion and removal of hockey sticks and can be used as a functional wall organization system for the same.

In embodiments, the claimed mount may:

Be made from vulcanized rubber or other suitable material such as EPDM rubber and have dimensions of about three inches in diameter and 1 inch thick, similar to a hockey puck;

Have a front recess to enable insertion of a hockey stick shaft;

The front recess edges may have a projection, radius or other feature to enable easy insertion/removal of the hockey stick shaft;

The rear side of the mount may have open space on each side of a boss to enable flexing of the mount when mounted flush against a wall or vertical structure to accommodate varying stick shaft widths; and There may be fastener receiving apertures in the front recess to create an area for the mounting screw head to sit flush with the recess bottom.

In an embodiment, a mount for attaching a hockey stick to a structure includes a body portion having a front side, a rear side, and defining a front recess adapted to receive the stick. The front recess is defined by a pair of opposing side walls and a rear wall, and each opposing side wall has a projection extending into the front recess proximate the front side. The rear side presents a boss having a pair of opposing sides, and defines a rear recess adjacent each of the opposing sides of the boss.

In embodiments, the front recess may be rectangular in cross-section. The body portion may be generally cylindrical or cuboidal.

In embodiments, the body portion may be made from vulcanized rubber or EPDM.

In embodiments, each projection may have a rounded end. The rear wall of the front recess may define at least one aperture adapted to receive a fastener. The hockey stick may have a shaft with a pair of opposing side faces, wherein the front recess is adapted to receive the shaft with the side faces of the shaft abutting the side walls of the front recess.

In further embodiments, a method of mounting a hockey stick to a vertical structure includes:

providing a mount, the mount comprising a body portion having a front side, a rear side, and defining a front recess adapted to receive a shaft of the hockey stick, the front recess being defined by a pair of opposing side walls and a rear wall, each opposing side wall having a projection extending into the front recess proximate the front side, a pair of opposing side portions being defined on either side of the front recess, the rear side presenting a boss having a pair of opposing sides, the rear side defining a rear recess adjacent each of the opposing sides of the boss;

attaching the mount to the vertical structure;

advancing the shaft of the hockey stick into the front recess, thereby causing the opposing side portions to deflect and the projections to deflect to admit the shaft into the front recess; and abutting the shaft against the rear wall of the front recess, enabling the opposing side portions to resiliently return, thereby gripping the shaft.

Further embodiments include a hockey stick, and a mount for attaching the hockey stick to a structure. The mount includes a body portion having a front side, a rear side, and defining a front recess adapted to receive a shaft of the hockey stick. The front recess is defined by a pair of opposing side walls and a rear wall, each opposing side wall having a projection extending into the front recess proximate the front side, the rear side presenting a boss having a pair of opposing sides, the rear side defining a rear recess adjacent each of the opposing sides of the boss.

In embodiments, the front recess is rectangular in cross-section, wherein when the shaft of the hockey stick is received in the front recess, the side walls of the front recess abut opposing side faces of the shaft. The body portion may be generally cylindrical and made from vulcanized rubber or EPDM. Each projection may have a rounded end. The rear wall of the front recess may define at least one aperture adapted to receive a fastener.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
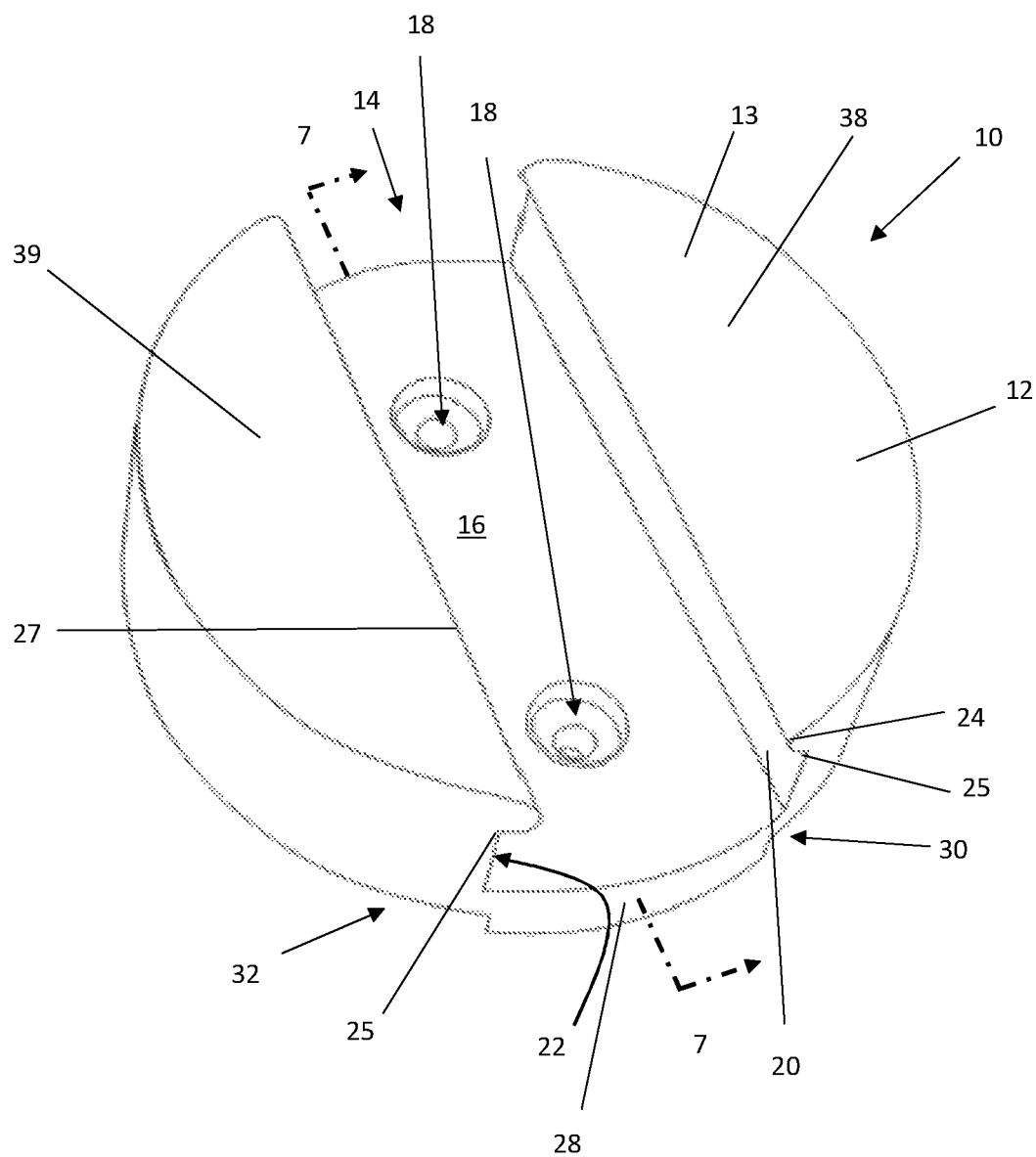
FIG. 1 is a perspective view of a mount according to an embodiment of the invention.
Figure 2:
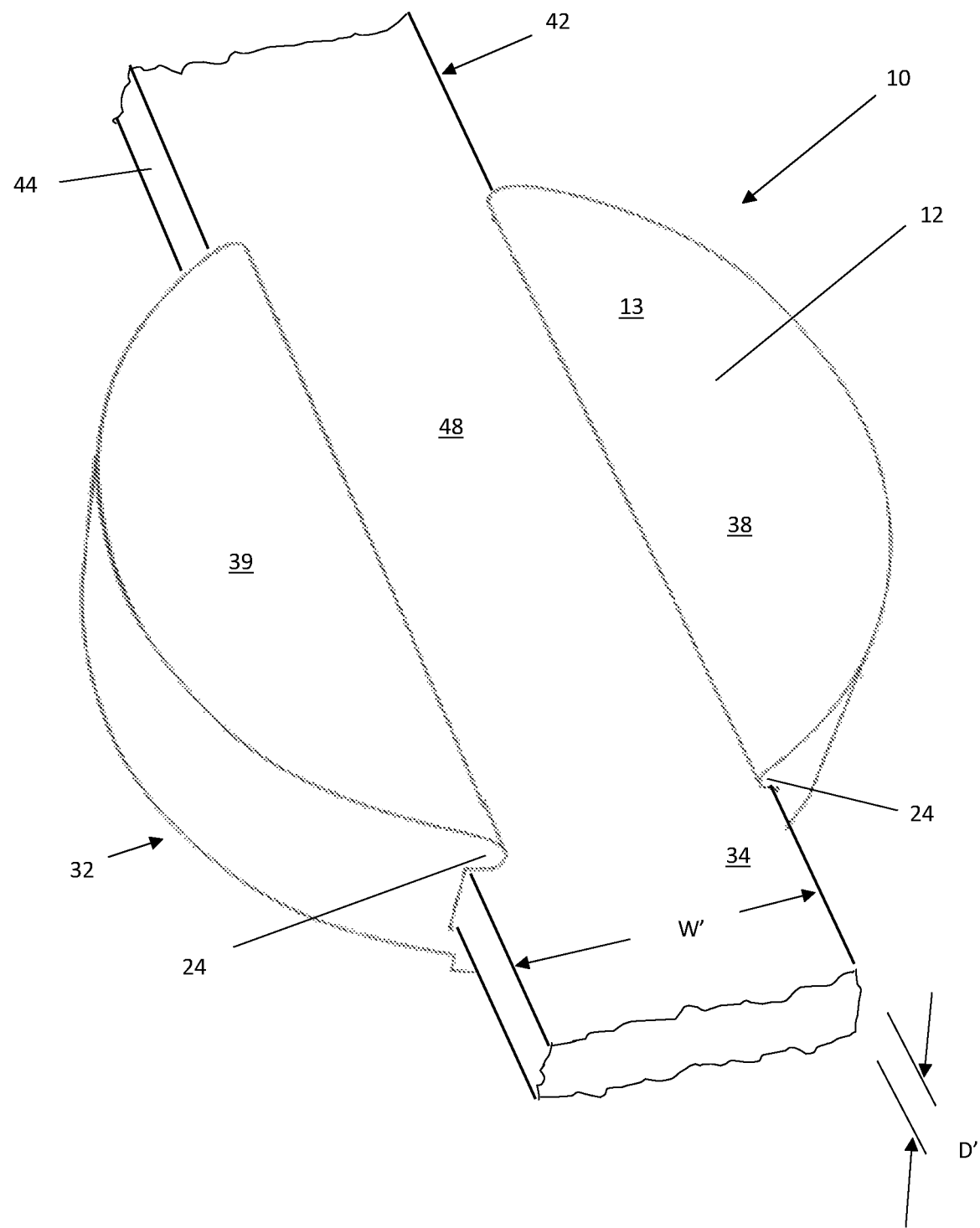
FIG. 2 is a perspective view of the mount of FIG. 1 with a partial view of a hockey stick received therein.
Figure 3:
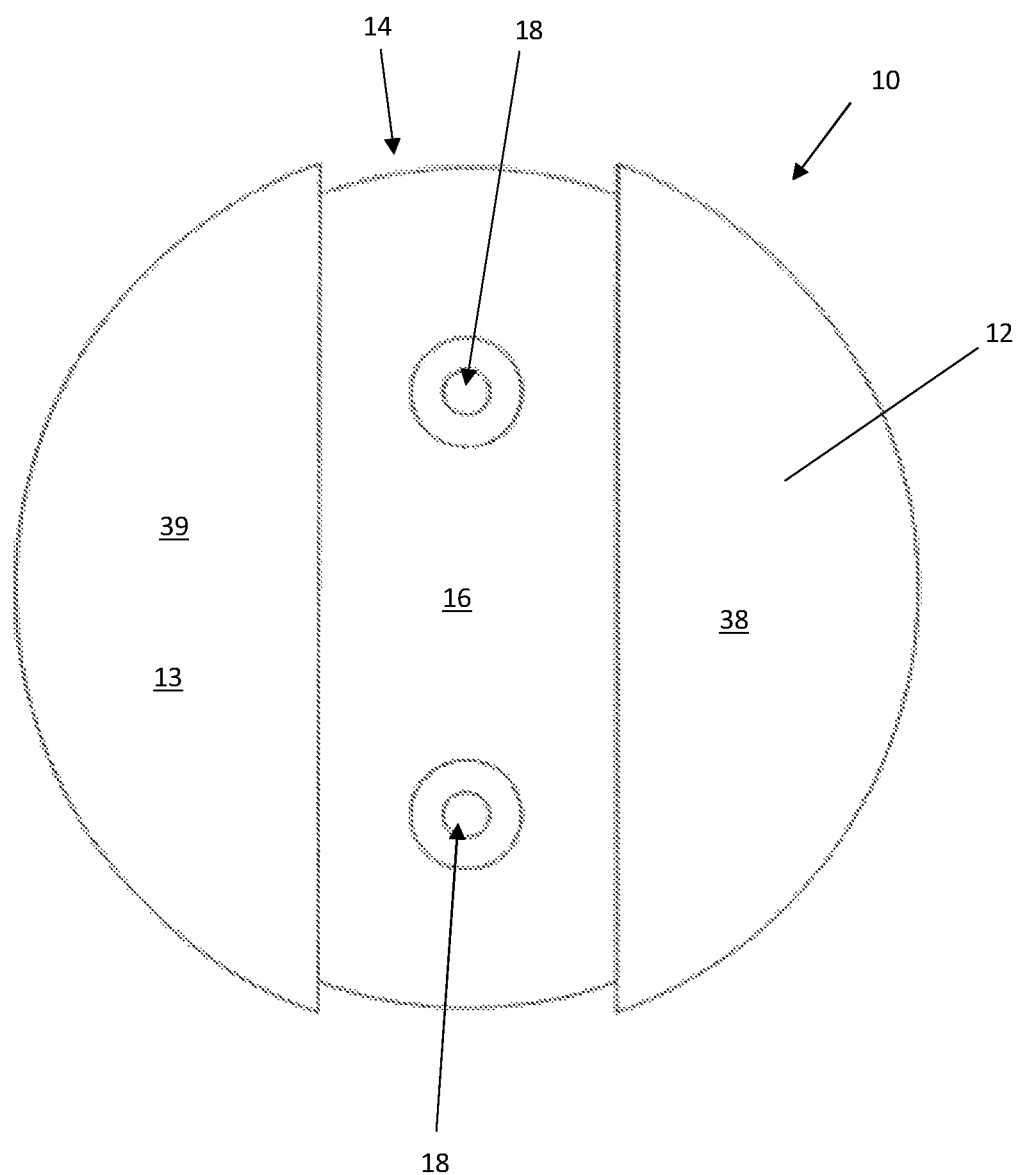
FIG. 3 is a front elevation view of the mount of FIG. 1.
Figure 4:
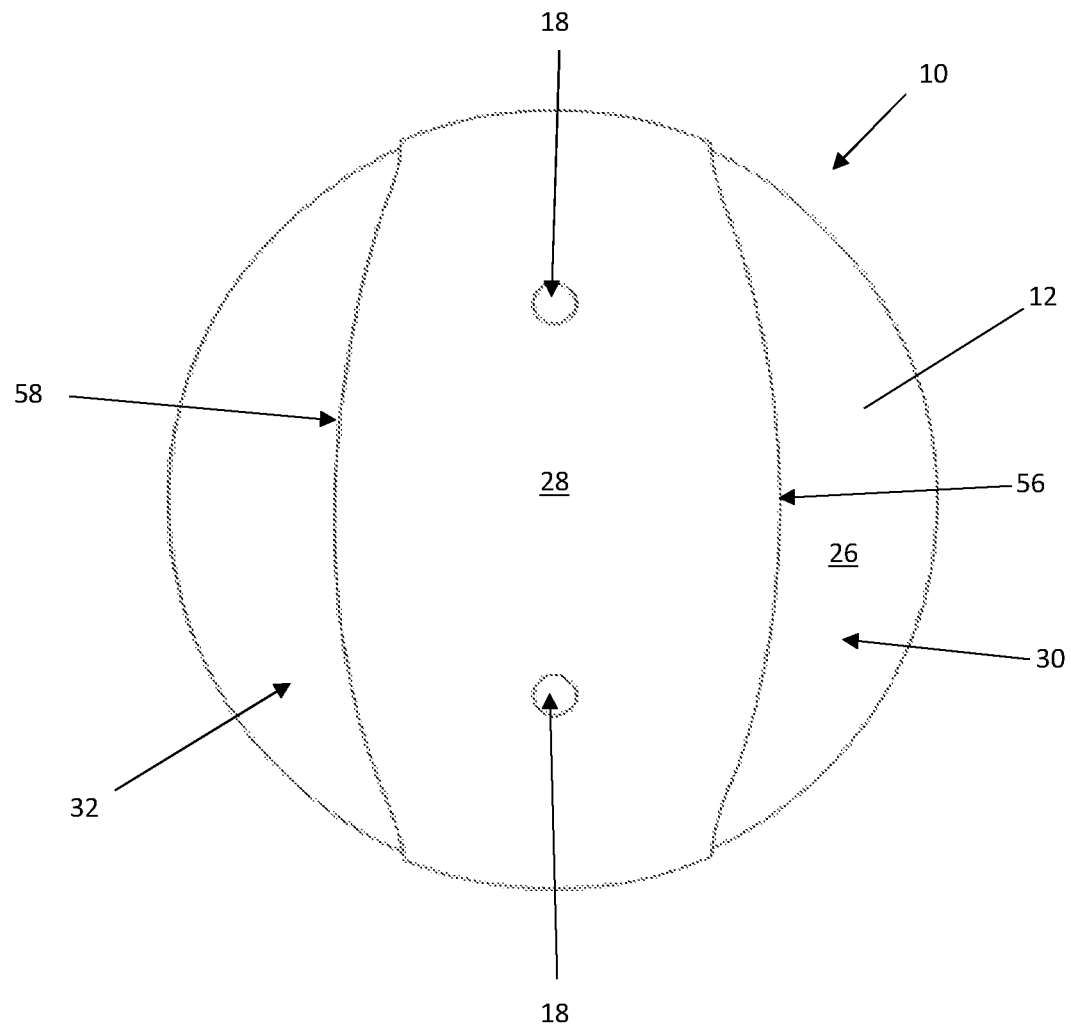
FIG. 4 is a rear elevation of the mount of FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

There is depicted in FIGS. 1 through 8, a mount 10 for sporting equipment according to an embodiment of the invention. Mount 10 generally includes cylindrical body 12 having front side 13, and defining front recess 14 having a generally rectangular cross-section. Back wall 16 of front recess 14 defines apertures 18 for receiving fasteners 52 to attach mount 10 to a wall 50 or other structure. As depicted, apertures 18 may be recessed or chamfered to enable fasteners 52 to be received flush or sunk relative to back wall 16. Front recess 14 has side walls 20, 22, each with projection 24, 27, extending into front recess 14 at the outer end 25 thereof proximate front side 13. Ends 24a, 27a, of projections 24, 27, may be rounded, chamfered, or otherwise relieved. Back side 26 of body 12 defines boss 28 having lateral side walls 56, 58. Back side 26 further defines rear recesses 30, 32, adjacent each of side walls 56, 58, of boss 28.

Body 12 can be made from vulcanized rubber material such as known for use in hockey pucks, or can be machined from a hockey puck. Alternatively, body 12 can be formed or machined from any other suitable material having flexible and resilient characteristics. For example, body 12 can be compression molded from ethylene propylene diene monomer (EPDM) rubber. It will be appreciated that although body 12 is depicted as generally cylindrical, body 12 may be made in other three-dimensional geometric shapes, such as, for example, a cuboid, or triangular prism.

Figure 5:
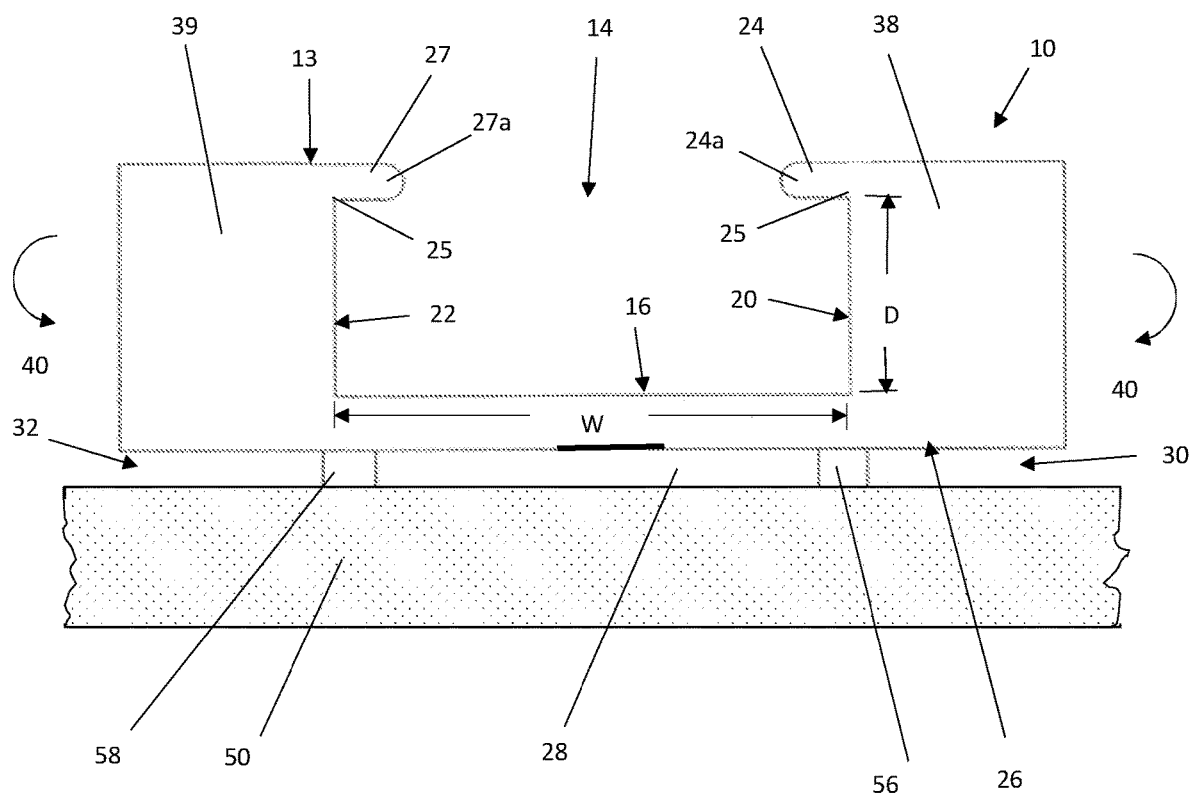
FIG. 5 is top plan view of the mount of FIG. 1.
Figure 6:
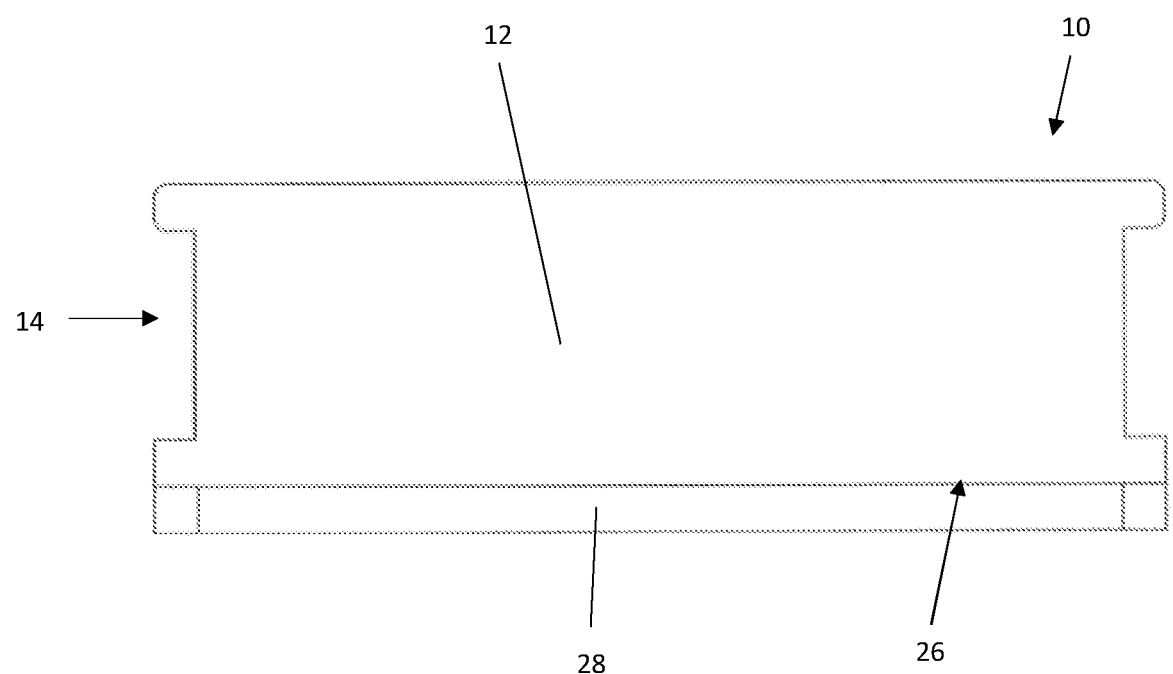
FIG. 6 is a side elevation view of the mount of FIG. 1.
Figure 7:
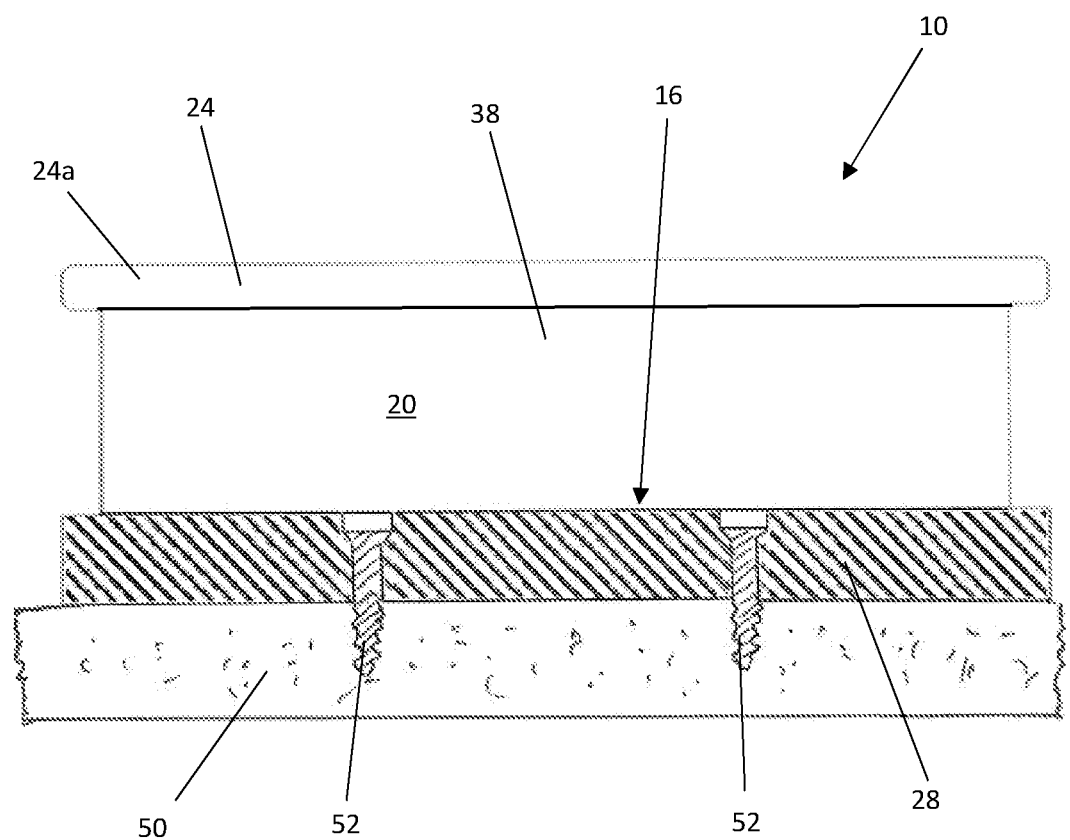
FIG. 7 is cross-section of the mount of FIG. 1 taken at section 7-7 of FIG. 1.

In use, mount 10 can be attached to a structure as depicted in FIGS. 5 and 7, such as a wall 50, column, or other generally vertical structure with fasteners 52 driven through apertures 18, and with front recess 14 oriented vertically and facing outward away from wall 50. Shaft 48 of a hockey stick 34 can be inserted into front recess 14 by advancing shaft 48 inwardly into recess 14 toward back wall 16, and past ends 24a, 27a, of projections 24, 27, respectively. Side portions 38, 39, of body 12 can flex slightly on each side of front recess 14 in the direction of arrows 40, enabled by rear recesses 30, 32. Further, projections 24, 27, can flex or deform slightly, and stick 34 can slide over rounded ends 24a, 27a, to enable stick 34 to pass. Once stick 34 is seated in recess 14, side portions 38, 39, return resiliently so that side walls 20, 22, confront and frictionally grip side faces 42, 44, of stick 34. Stick 34 is thereby held in place vertically via friction with side walls 20, 22, and horizontally with projections 24. Stick 34 can be easily removed from front recess 14 by pulling outwardly, causing side portions 38, 39, and projections 24, 27, to flex, and stick 34 to slide past rounded ends 24a, 27a. Once stick 34 is removed, side portions 38, 39, return resiliently to their original position.

Front recess 14 can have a width dimension W generally matching width dimension W' of shaft 48, and a depth dimension generally matching thickness dimension D' of shaft 48. It will be appreciated however, that width dimension W' may also be slightly larger than width dimension W due to the flexibility and resilience of side portions 38, 39. Hence, shafts 48 of varying widths corresponding to standard hockey stick dimensions may be accommodated in recess 48 without altering width dimension W. Alternatively, multiple mounts 10 can be made with front recess 14 having varying dimensions W and D to accommodate different size shafts.

Of course, while a vertical orientation of mount 10 is described, mount 10 may also be used to mount equipment horizontally or at other angles relative to the vertical, and may be attached to non-vertical structures.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:
1. A mount for attaching a hockey stick to a structure, the mount comprising:

a body portion having a front side, a rear side, and defining a front recess adapted to receive the hockey stick, the front recess being defined by a pair of opposing side walls and a rear wall, a width of the front recess being constant from a top end of the front recess to a bottom end of the front recess, each opposing side wall having a projection extending into the front recess proximate the front side, the rear side presenting a boss having a pair of opposing sides, the rear side defining a rear recess adjacent each of the opposing sides of the boss, wherein the body portion is made from a resilient material, thereby enabling a shaft of the hockey stick to be inserted and removed from the front recess by deflecting the opposing side walls relative to the rear wall.

2. The mount of claim 1, wherein the front recess is rectangular in cross-section.

3. The mount of claim 1, wherein the body portion is generally cylindrical.

4. The mount of claim 1, wherein the body portion is cuboidal.

5. The mount of claim 1, wherein the body portion is made from vulcanized rubber or EPDM.

6. The mount of claim 1, wherein each of the projections has a rounded end.

7. The mount of claim 1, wherein the rear wall of the front recess defines at least one aperture adapted to receive a fastener.

8. The mount of claim 1, wherein the hockey stick has a shaft with a pair of opposing side faces, and wherein the front recess is adapted to receive the shaft with the side faces of the shaft abutting the side walls of the front recess.

9. A hockey stick, and a mount for attaching the hockey stick to a structure, the mount comprising: a body portion having a front side, a rear side, and defining a front recess adapted to receive a shaft of the hockey stick, the front recess being defined by a pair of Opposing side walls and a rear wall, each opposing side wall having a projection extending into the front recess proximate the front side, the rear side presenting a boss having a pair of opposing sides, the rear side defining a rear recess adjacent each of the opposing sides of the boss, wherein the front recess is rectangular in cross-section, the shaft of the hockey stick is received in the front recess, and the side walls of the front recess abut opposing side faces of the shaft.

10. The hockey stick and mount of claim 9, wherein the body portion is generally cylindrical.

11. The hockey stick and mount of claim 9, wherein the body portion is made from vulcanized rubber or EPDM.

12. The hockey stick and mount of claim 9, wherein each projection has a rounded end.

13. The hockey stick and mount of claim 9, wherein the rear wall f the front recess defines at least one aperture adapted to receive a fastener.

\* \* \* \* \*